United States Patent
Ariyoshi et al.

(10) Patent No.: US 8,455,149 B2
(45) Date of Patent: Jun. 4, 2013

(54) CONNECTING STRUCTURE TO CELL OF VOLTAGE DETECTING CONNECTOR AND FUEL CELL

(75) Inventors: Toshiaki Ariyoshi, Utsunomiya (JP); Jun Kondo, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/217,046

(22) Filed: Aug. 24, 2011

(65) Prior Publication Data

US 2011/0305964 A1    Dec. 15, 2011

Related U.S. Application Data

(62) Division of application No. 11/198,259, filed on Aug. 5, 2005, now Pat. No. 8,026,012.

(30) Foreign Application Priority Data

Aug. 12, 2004  (JP) ................................. 2004-235153
Aug. 12, 2004  (JP) ................................. 2004-235154

(51) Int. Cl.
    *H01M 8/24*    (2006.01)
(52) U.S. Cl.
    USPC ........................... 429/452; 429/535; 429/465
(58) Field of Classification Search
    USPC ......... 429/428, 432, 452, 457, 463, 467–471, 429/507–508, 511, 517–518, 535
    See application file for complete search history.

(56) References Cited

U.S. PATENT DOCUMENTS

| | | | |
|---|---|---|---|
| 6,432,569 | B1 | 8/2002 | Zeilinger et al. |
| 6,730,423 | B2 | 5/2004 | Einhart et al. |
| 2002/0179455 | A1 | 12/2002 | Hanaoka |
| 2003/0048091 | A1 | 3/2003 | Sato et al. |
| 2003/0091884 | A1* | 5/2003 | Scartozzi ........................ 429/32 |
| 2004/0131905 | A1 | 7/2004 | Enjoji et al. |

FOREIGN PATENT DOCUMENTS

| | | |
|---|---|---|
| JP | 9-283166 | 10/1997 |
| JP | 11-273702 | 10/1999 |
| JP | 2000-223141 | 8/2000 |
| JP | 2000-277136 | 10/2000 |
| JP | 2002-124285 | 4/2002 |
| JP | 2002-184434 | 6/2002 |
| JP | 2002-352820 | 12/2002 |
| JP | 2002-358993 | 12/2002 |
| JP | 2003-86219 | 3/2003 |
| JP | 2003-109649 | 4/2003 |
| WO | WO 2005008826 A1 * | 1/2005 |

OTHER PUBLICATIONS

Notice of Allowance issued Mar. 30, 2010 by the Japanese Patent Office in JP 2004-235153, which corresponds to U.S. Appl. No. 11/198,259 (6 pages, English translation provided).

(Continued)

*Primary Examiner* — Maria J Laios
(74) *Attorney, Agent, or Firm* — Hamre, Schumann, Mueller & Larson, P.C.

(57) ABSTRACT

A voltage detecting connecting structure and fuel cell has connectors which are in contact with terminals connected to the fuel cell. An embodiment of the fuel cell includes first cells which have the terminals at an anode and a cathode respectively, and second cells which have terminals in neither an anode plate nor a cathode, stacked alternately.

4 Claims, 10 Drawing Sheets

OTHER PUBLICATIONS

Notice of Reasons for Refusal issued Mar. 17, 2009 by the Japanese Patent Office in JP 2004-235154 which corresponds to U.S. Appl. No. 11/198,259 (English translation provided).

The Fuel Cell Handbook, $5^{th}$ ed. West Virginia, US Department of Energy, 2000. pp. 1-1-1-2.

* cited by examiner

CONNECTING STRUCTURE TO CELL OF VOLTAGE DETECTING CONNECTOR AND FUEL CELL

CROSS-REFERENCE TO RELATED APPLICATIONS

This application is a Division of application Ser. No. 11/198,259, filed Aug. 5, 2005, which application is incorporated herein by reference.

BACKGROUND OF THE INVENTION

1. Field of the Invention

The present invention relates to a connecting structure to a cell of an electrical voltage detecting connector which is connected to a fuel cell constituted by laminating plural cells having an anode and a cathode, for detecting electrical voltage of the cell, and to a fuel cell.

Priority is claimed on Japanese Patent Application No. 2004-235153, filed Aug. 12, 2004, and Japanese Patent Application No. 2004-235154, filed Aug. 12, 2004, the contents of which are incorporated herein by reference.

2. Description of Related Art

In recent years, fuel cells are attracting attention as a new source of power, such as for an automobile. In general, a fuel cell consists of a membrane electrode architecture (MEA) in which an anode electrode (negative electrode) and a cathode electrode (positive electrode) are disposed on either side of a solid polymer electrolyte membrane respectively, and a pair of separators which contain the membrane electrode architecture therebetween. When this fuel cell is operated to generate electricity, it generates an electrochemical reaction by supplying gaseous fuel (for example, hydrogen gas) to the anode electrode of the fuel cell, and supplying oxidizing gas (for example, air containing oxygen) to the cathode electrode. Since only harmless water is generally generated when generating electrical power, the fuel cell attracts attention from a viewpoint of influence on the environment or use efficiency.

Incidentally, it is difficult to obtain electric power sufficient to drive an automobile from one fuel cell. It has been investigated to mount a fuel cell which has a stack structure in which plural cells each of which is formed by interposing a membrane electrode architecture between a pair of separators are layered, in an automobile, such that sufficient electric power to drive the automobile can be supplied.

In this case, in order to monitor whether a cell which constitutes a fuel cell is generating electricity normally, it is very important to detect the voltage of the cell. From such a viewpoint, a fuel cell provided with terminals for measuring voltage is proposed.

For example, patent document 1 (Japanese Unexamined Patent Application, First Publication No. H09-283166) discloses technology in which a circular hole is formed in the carbon plate of each cell, and one end of an output terminal is connected to the circular hole using a banana clip, and another end of an output terminal bundle with a voltage measuring apparatus is connected through a connector.

Moreover, patent document 2 (Japanese Unexamined Patent Application, First Publication No.2003-86219) discloses technology of clipping a terminal holder which holds terminals disposed on separators of cells of a fuel cell, thereby making the terminals unmovable.

Figure 5:
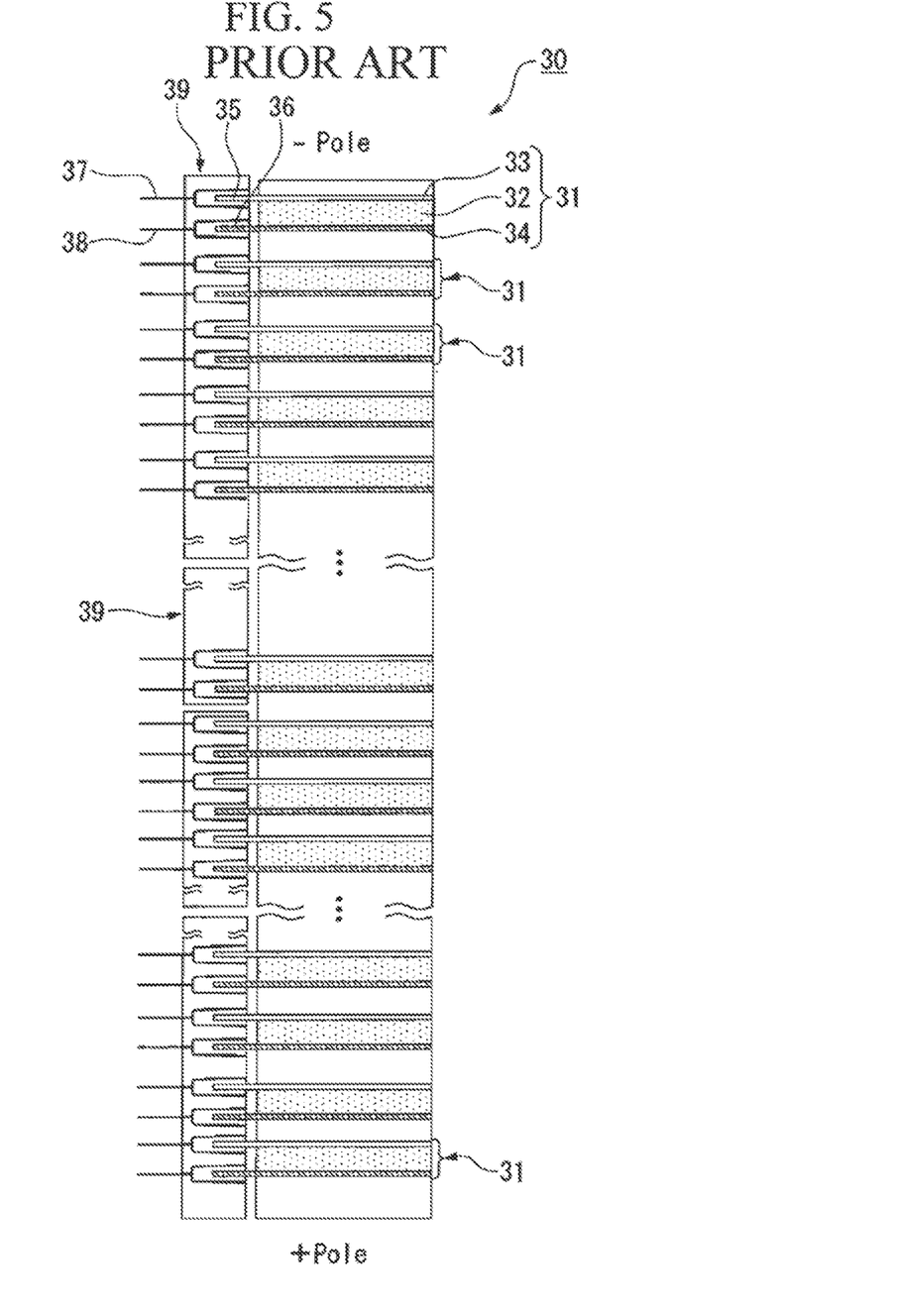
FIG. 5 is a sectional view of the principal part of a fuel cell and a voltage detecting connector connected to the fuel cell in the above.

Moreover, cross sections of the principal part of a fuel cell and of a voltage detecting connector which is connected to the fuel cell are shown in FIG. 5. As shown in this figure, a fuel cell 30 consists of a predetermined number (in this case, n) of cells 31, which are stacked. Each cell 31 is interposed between separators 33 and 34 in a membrane electrode architecture 32. In each cell 31, terminals 35 and 36 for measuring electrical voltage are disposed on the separator 33 at an anode electrode side and the separator 34 at a cathode electrode side, respectively. A cell connecting device 39 is connected to the fuel cell 30 thus constituted. The cell connecting device 39 is equipped with a predetermined numbers of connectors 37 and 38, whereby the electrical voltage of the separators 33 and 34 disposed at the terminals 35 and 36 can be detected by contacting the connectors 37 and 38 with the terminals 35 and 36, thereby, detecting electrical voltage in each cell.

However, hitherto, there were the following problems. That is, in the conventional art, as explained above, referring to FIG. 5, in general, each terminals 35 and 36 of the fuel cell 30 are arranged in series in the same position when they are looked at from a direction of layering. However, in order to mount the fuel cell 30 in a vehicle etc., it is required to reduce the thickness of each cell 31 to as thin as possible, and the gap between the terminals 35 and 36 tends to become narrow inevitably in connection with this.

As a result, when the terminals 35 and 36 are arranged in series, the gap between the terminals 35 and 36 becomes narrow, and there is possibility of interference with the connection of the connectors 37 and 38, if for example, the gap between the cell connecting devices 39 provided with the connectors 37 and 38 cannot be maintained sufficiently, and as a result, the cell connecting devices 39 come into contact with each other, etc.

Moreover, since it is necessary to stack a lot of cells 31 in order to obtain a required output in the case in which the fuel cell 30 is mounted in a vehicle, if the terminals 35 and 36 are disposed on all of the separators 33 and 34 of each cell 31, the weight will increase to an extent that cannot be ignored because of the terminals 35 and 36, and the cost will increase.

Figure 10:
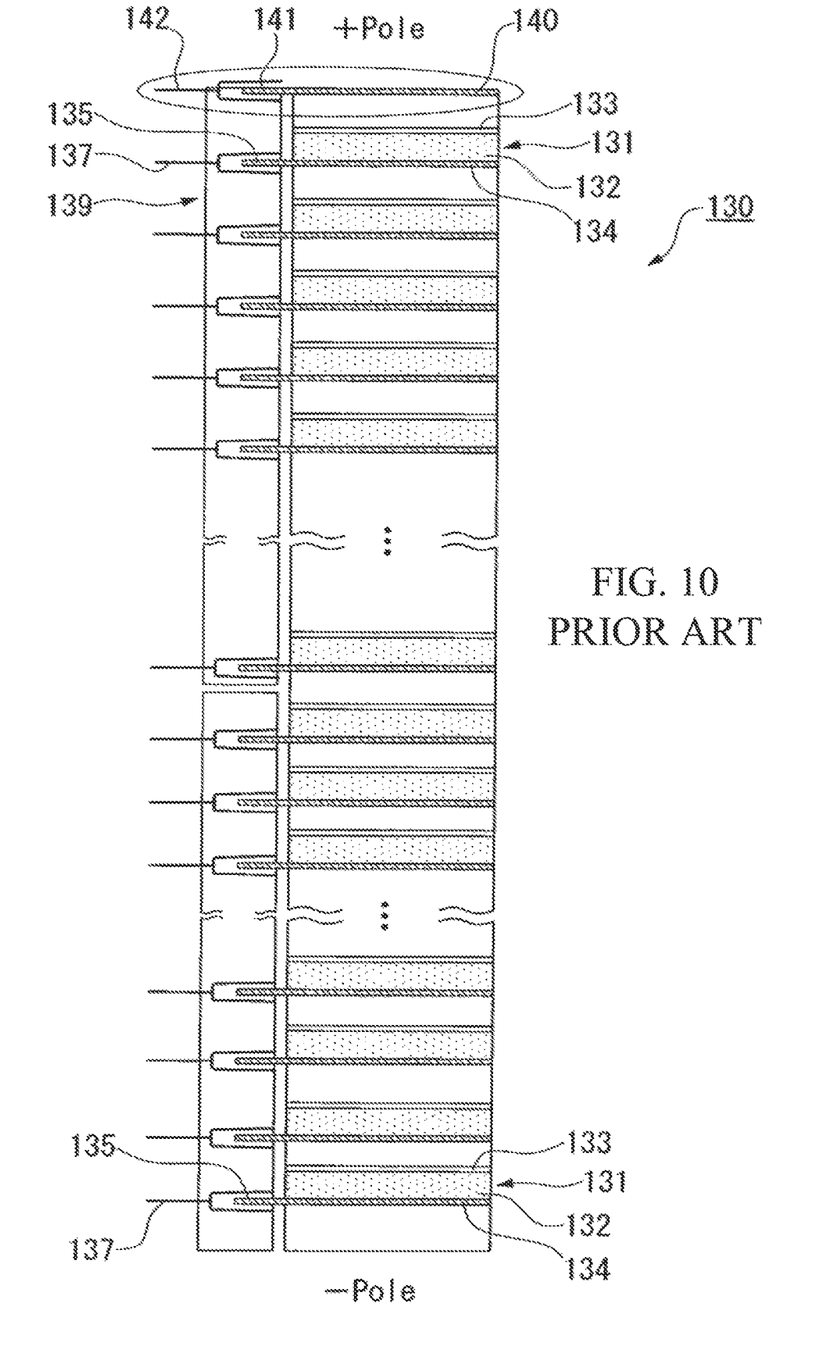
FIG. 10 is a sectional view of the principal part of a fuel cell or a voltage detecting connector connected to the fuel cell in the above.

Next, cross sections of the principal part of a fuel cell and of a voltage detecting connector which is connected to the fuel cell are shown in FIG. 10, as is disclosed in, for example, the patent document 3 (Japanese Unexamined Patent Application, First Publication No. 2002-352820). As shown in this figure, a fuel cell 130 consists of a predetermined number (in this case, n) of cells 131, which are stacked. Each cell 131 is interposed between separators 133 and 134 in a membrane electrode architecture 132. In each cell 131, a terminal 135 for measuring electrical voltage is disposed on a separator 133 at an anode electrode side. A cell connecting device 139 is connected to the fuel cell 130 thus constituted. The cell connecting device 139 is equipped with a predetermined number of connectors 137, whereby the electrical voltage of the separators 133 disposed at the terminals 135 can be detected by contacting the connectors 137 with the terminals 135, thereby detecting electrical voltage in each cell.

However, there are the following problems in the prior art. That is, hitherto, as explained referring to FIG. 10, because a terminal is disposed on the separator of one electrode (for example, an anode electrode), in order to detect the cell voltage of one cell, the monitoring is performed ranging over the separator of the electrode shared with the adjoining cell. As a result, in the case of detecting the cell voltage of the end cell of a stacked body in which plural cells are stacked, there is no cell adjoining thereto, and it is impossible to detect the cell voltage of the end cell. Therefore, in order to detect the cell voltage of the end cell, as shown in FIG. 10, it is necessary to dispose a cover plate (dummy separator) 140 having the same shape as a separator (separator at the side of an anode electrode) 134, on the end of the stacked body of cells and to dispose a terminal 141 for a connector 142 on the cover plate 140. Thus, it is necessary to dispose separately, a separator, a terminal, and a connector, which are not related to power generation, and the number of parts increases, thereby increasing cost, stacking width, and weight.

SUMMARY OF THE INVENTION

Therefore, it is an object of the present invention to provide a connecting structure to the cell of a voltage detecting connector which can prevent increase in weight due to terminals and increase of cost, while detecting all of the cell voltages and maintaining gaps between terminals, and a fuel cell.

In addition, it is another object of the present invention to provide a connecting structure to the cell of a voltage detecting connector which can detect the cell voltage at both ends of the stacked body, while prevent increase in the number of parts, cost, stacking width, and weight, and a fuel cell.

The first aspect of the present invention is a connecting structure between a connecting apparatus for a fuel cell and a fuel cell (for example, a fuel cell 1, in the embodiment) having a structure in which first cells (for example, first cells 2a in the embodiment) having terminals (for example, terminals 6 and 7, in the embodiment) provided to cathodes (for example, cathode electrodes 12, in the embodiment) and anodes (for example, anode electrodes 11, in the embodiment) thereof, and second cells (for example, second cells 2b, in the embodiment) having terminals provides to neither cathodes nor anodes thereof are stacked in alternation, characterized in that the connecting apparatus and the fuel cell are electrically connected by contacting the terminals with the connectors which are disposed at positions corresponding to the terminals, in the connecting apparatus.

According to the first aspect of the present invention, since two opposed electrodes of two cells adjoining in the stacking direction have the same electric potential, the anodes or the cathodes of the second cell in the fuel cell have the same electric potential as the anodes or the cathodes of the first cells which adjoin the second cells in the stacking direction. Therefore, since the voltage of the second cells with no terminals can be obtained from the electric potential of the anodes or the cathodes of the first cells which adjoin the second cells in the stacking direction, it is possible to maintain high detecting accuracy equivalent to the case in which terminals are disposed on the anodes and the cathodes of all of the cells. Moreover, compared to the case in which terminals are disposed on the anodes and the cathodes of all of the cells, the total number of terminals can be reduced to be approximately half, and hence, it is possible to maintain sufficient gaps between the terminals, thereby enabling the connectors to be connected to the terminals smoothly. In addition, it is possible to lower increase of weight caused by the terminals as well as cost.

The second aspect of the present invention is a connecting structure according to the first embodiment, in which the first cells are disposed on at least both ends of the fuel cell, and the connectors are connected to the fuel cell consisting of the first cells and the second cells which are stacked alternately from both ends of the fuel cell.

According to the second aspect of the present invention, since the first cells are disposed on both sides of the fuel cell, and the first cells and the second cells are stacked alternately from both ends, it is possible to know certainly the voltage of the first cells which are disposed on both ends and the second cells which adjoin the first cells, and as a result, it becomes possible to detect the voltage ranging over all of the cells, while lowering increase of weight due to the terminals and also cost, thereby maintaining the detecting accuracy of the cell voltages to be equivalent to the case of disposing terminals to anodes and cathodes of all of the cells. In addition, by disposing the cells having terminals on both ends, it becomes unnecessary to use special dummy cells.

The third aspect of the present invention is a fuel cell including: first cells provided with terminals to each of anodes and cathodes thereof, and second cells provided with no terminals to neither anodes nor cathodes thereof, in which the first cells and the second cells are stacked alternately.

According to the third aspect of the present invention, since the voltage of the second cells with no terminals can be obtained from the electric potential of the anodes or the cathodes of the first cells which adjoin the second cells in the stacking direction, substantially all of the cell voltages can be detected, and thereby it is possible to maintain high detecting accuracy equivalent to the case of disposing terminals to anodes and cathodes of all of the cells. Moreover, compared to the case of disposing terminals to anodes and cathodes of all of the cells, the total number of terminals can be reduced to be approximately half, and hence, it is possible to maintain the gaps sufficiently between the terminals, which enables the connectors to be connected to the terminals smoothly. In addition, it is possible to lower increase of weight caused by the terminals as well as cost.

The fourth aspect of the present invention is a fuel cell according to the third aspect of the present invention, in which the first cells are disposed to at least both ends in the direction of stacking, and the first cell and the second cell are stacked alternately from both ends.

According to the fourth aspect of the present invention, since the voltages of the first cell which are disposed to both ends and the second cells which adjoin the first cells in the stacking direction can be certainly known, it becomes possible to detect the voltages ranging over all of the cells, while lowering increase of weight caused by the terminals as well as cost, and as a result, it is possible to maintain detecting accuracy at a level which is equivalent to the case of disposing terminals to anodes and cathodes of all of cells. Moreover, by disposing the cells with terminals on both ends, it becomes unnecessary to use special dummy cells.

The fifth aspect of the present invention is a connecting structure between a connecting apparatus for a fuel cell and a fuel cell (for example, the fuel cell 1 in the embodiment) having a structure in which first cells (for example, the first cell 2a in the embodiment) having terminals (for example, the terminal 6 in the embodiment) provided only to anodes (for example, an anode electrode 111) thereof, and second cells having terminals provided only to cathodes (for example, the cathode electrode 12 in the embodiment) thereof are stacked in alternation, characterized in that the connecting apparatus and the fuel cell are electrically connected by contacting the terminals with the connectors (for example, the connectors 8 and 9 in the embodiment) which are disposed at positions corresponding to the terminals, in the connecting apparatus.

According to the fifth aspect of the present invention, since mutually opposing electrodes of the cells adjoining each other in the stacking direction have the same electrical potential, the anodes or the cathodes of a cell have the same electrical potential as in the anodes or the cathodes of the cells which oppose to the cell. Since only the first cells which have terminals on the anodes only are stacked from the anode-side end, the electrical potentials of the anodes of the first cells which are detection targets can be obtained from the terminals which are disposed on the anodes, whereas the electrical potentials of the cathodes of the first cells can be obtained from the terminals which are disposed on the anodes of the cells which adjoin the cells, and from these the voltages of the first cells, which are detection targets, can be obtained. On the other hand, since the second cells, which have a terminal only at the cathode, are stacked from the cathode-side end, the electrical potentials of the cathodes of the second cells which are detection targets can be obtained from the terminals which are disposed on the cathodes, whereas the electrical potential of the anodes of the second cells can be obtained from the terminals which are disposed on the cathodes of the cells which adjoin the cell, and from these the voltages of the second cells, which are detection targets, can be obtained. Thus, it is possible to detect the cell voltage at both ends, without disposing parts which have nothing to do with electric generation, such as dummy separators, terminals, and connectors to the end especially. Moreover, it is possible to maintain high detecting accuracy which is approximately equivalent to the case of disposing terminals to anodes and cathodes of all of the cells, and to lower the total number of terminals to be approximately half thereof, compared to the case of disposing terminals to anodes and cathodes of all of the cells, and hence it becomes possible to maintain the gaps between the terminals sufficiently, and thereby it becomes possible to connect the connectors to the terminals smoothly. In addition, it is possible to lower increase of weight caused by the terminals as well as cost.

The sixth aspect of the present invention is the connecting structure, according to the fifth aspect of the present invention, in which the connectors are connected to terminals of a fuel cell including a third cell (for example, the third cell 2c in the embodiment) provided with no terminals at an anode and a cathode thereof, and the first cells or the second cells which are stacked alternately.

According to the sixth aspect of the present invention, the third cells are stacked alternately with the first cells or the second cells, thereby it is possible to reduce the number of the terminals which are disposed to a fuel cell, to lower increase of weight and cost, while maintaining the necessary detecting accuracy.

The seventh aspect of the present invention is a fuel cell including: first cells provided with terminals to each of anodes and cathodes thereof, and second cells provided with no terminals to neither anodes nor cathodes thereof, in which the first cells are stacked from an end of an anode side in a stacking direction and the second cells are stacked from an end of a cathode side in a stacking direction, alternately.

According to the seventh aspect of the present invention, even if the parts which have nothing to do with power generation, such as dummy separators, terminals, and connectors are not disposed on the end especially, the cell voltages of both ends can be detected. Moreover, it is possible to maintain high detecting accuracy which is approximately equivalent to the case of disposing terminals to anodes and cathodes of all of the cells, and to lower the total number of terminals to be approximately half, compared to the case of disposing terminals to anodes and cathodes of all of the cells, and hence it becomes possible to maintain the gaps between the terminals sufficiently, and thereby it becomes possible to connect the connectors to the terminal smoothly. In addition, it is possible to lower increase of weight caused by the terminals as well as cost.

The eighth aspect of the present invention is the fuel cell according to the seventh aspect of the present invention, in which the third cells from neither anodes nor cathodes of which terminal are taken out are stacked with the first cell or the second cell alternately.

According to the eight aspect of the present invention, it is possible to reduce the number of the terminals which are disposed to a fuel cell, to lower increase of weight and cost, while maintaining the necessary detecting accuracy.

DETAILED DESCRIPTION OF THE INVENTION

Hereinafter, the connecting structure to a cell of the voltage detecting connector and fuel cell in one preferred embodiment of the present invention will be explained with reference to drawings.

Figure 1:
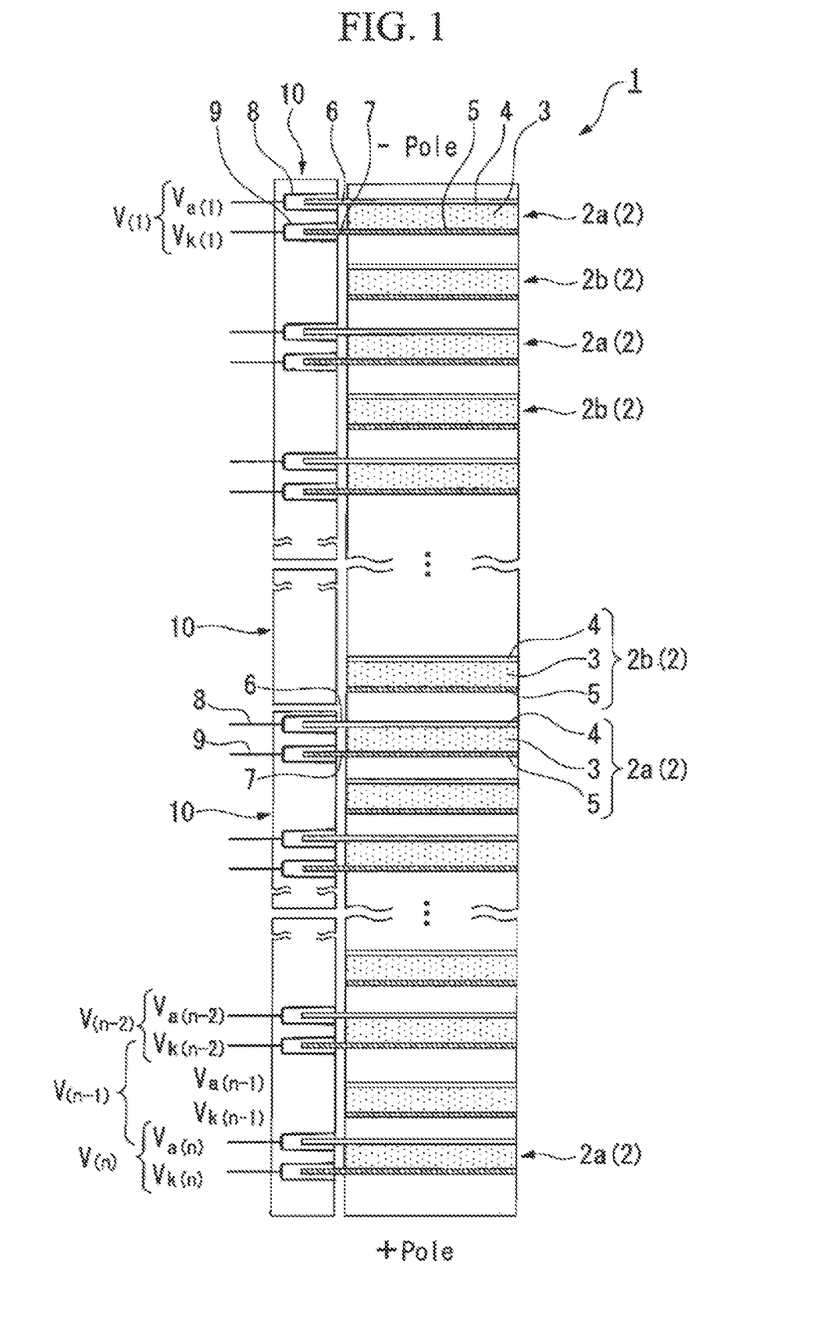
FIG. 1 is a sectional view of the principal part of a cell connecting apparatus equipped with a fuel cell and a voltage detecting connector connected to the fuel cell in one embodiment of the present invention.

FIG. 1 is a sectional view of the principal part of a cell connecting apparatus equipped with a fuel cell and a voltage detecting connector connected to the fuel cell in one preferred embodiment of the present invention. As shown in this figure, a fuel cell 1 is constituted from a plurality of cells 2 which are stacked in a predetermined numbers (in this case, n). Each cell 2 is constituted by sandwiching a membrane electrode structure 3 with separators 4 and 5.

The fuel cell 1 in this embodiment is equipped with first cells 2a (2) in which terminals 6 and 7 for measuring voltage are disposed on separators 4 on anode electrode 11 sides (refer to FIG. 2) and separators 5 on cathode electrode 12 sides (refer to FIG. 2) respectively, and second cells 2b (2) which have terminals 6 and 7 in neither the separators 4 nor the separators 5.

The first cells 2a are disposed at both ends on a [+] polar side and a [−] polar side, and first cells 2a and the second cells 2b are alternately stacked from the both ends.

A cell connecting apparatus 10 is connected to the thus constituted fuel cell 1. The cell connecting apparatus 10 is equipped with a predetermined number of connectors 8 and 9, and can detect the voltage of the first cells 2a to which terminals 6 and 7 are disposed, by contacting the connectors 8 and 9 with the terminals 6 and 7 provided to the first cells 2a, respectively. As to the detection of the voltages of the second cells 2b, details will be mentioned later.

Figure 2:
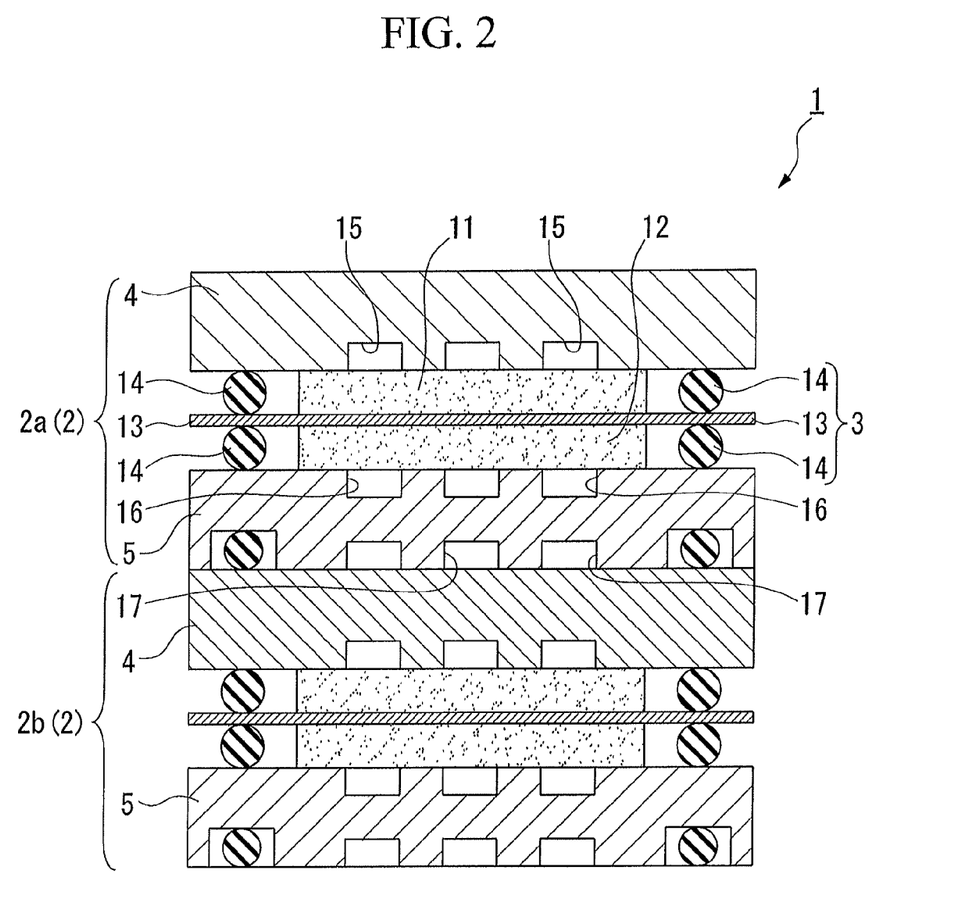
FIG. 2 is a schematic sectional view of a cell which constitutes a fuel cell shown in FIG. 1.

FIG. 2 is a schematic sectional view of a cell which constitutes the fuel cell shown in FIG. 1. As shown in this figure, the membrane electrode structure 3 is equipped with a solid polymer electrolyte membrane 13, and an anode electrode 11 and a cathode electrode 12 disposed on either side thereof.

A ring-like sealing member 14 is set at the periphery of the surface where a pair of the separators 4 and 5, which are disposed on either side of the membrane electrode structure 3, are opposed to each other, and the solid polymer electrolyte membrane 13 is sandwiched by the sealing members 14. A fuel gas path 15, an oxidizing gas path 16, and a cooling medium path 17 for supplying fuel gas, oxidizing gas, and a cooling medium, respectively, are formed in both the separators 4 and 5.

Figure 3:
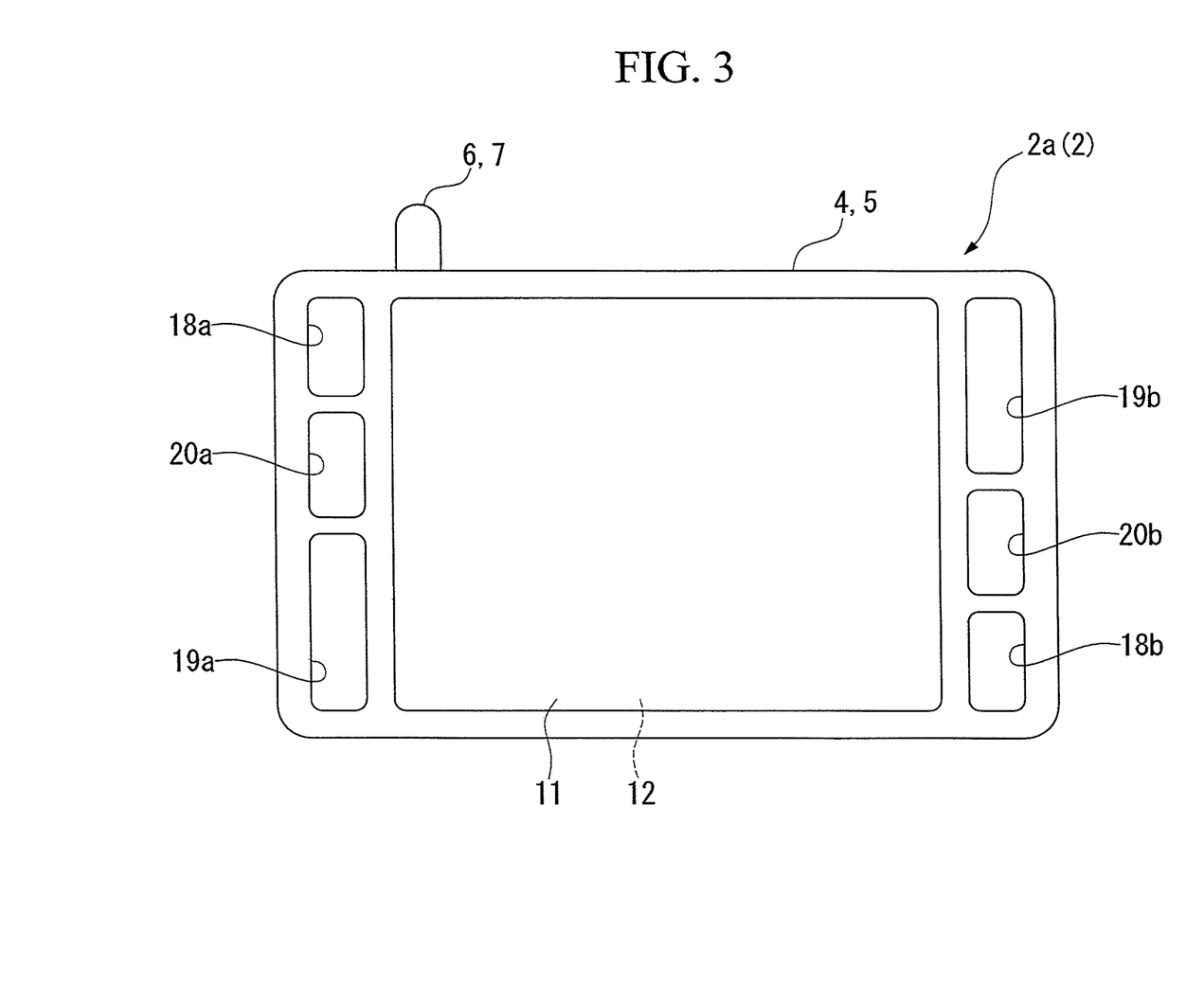
FIG. 3 is a plan view of the first cell shown in FIG. 1.

FIG. 3 is a plan view of one of the first cells in this embodiment. As shown in this figure, fuel gas penetrating holes 18a and 18b, oxidizing gas penetrating holes 19a and 19b, and cooling medium penetrating holes 20a and 20b are formed on both sides. In these penetrating holes, those on one side (left side in the drawing) serve as supplying ports 18a, 19a and 20a, whereas those on the other side (right side in the drawing) serve as discharging ports 18b, 19b, and 20b. It should be noted that the separator may be formed by cutting carbon etc., and may be formed by press molding a metal etc.

Figure 4:
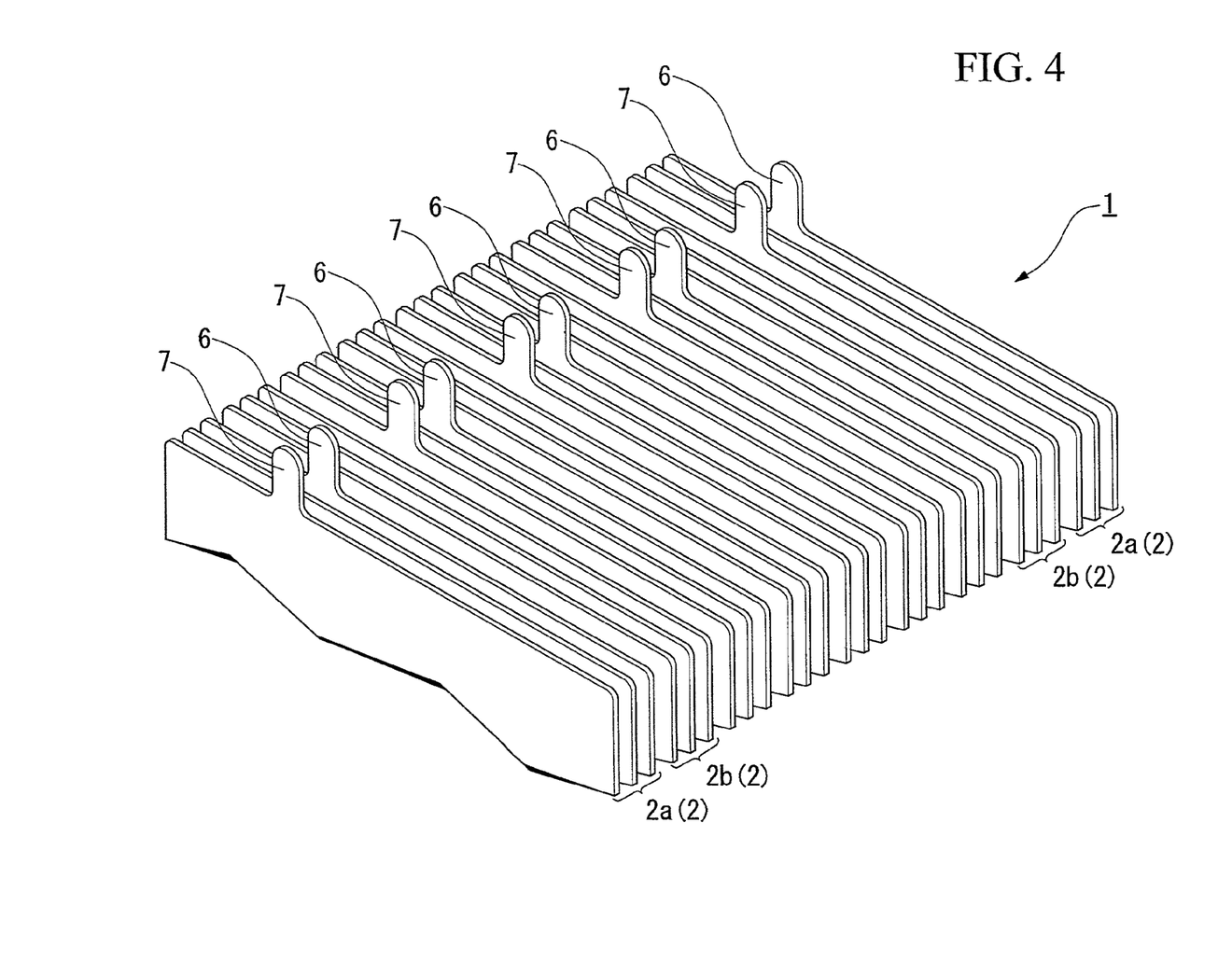
FIG. 4 is a perspective view of the principal part the fuel cell shown in FIG. 1.

Moreover, the terminals 6 and 7 disposed on the separators 4 and 5 of the first cell 2a are, as shown in FIG. 4, formed at approximately the same position, respectively, when they are looked at in the stacking direction.

In the fuel cell 1 thus constituted, fuel gas (for example, hydrogen gas) is supplied to the anode electrode 11 through the fuel gas path 15, and oxidizing gas (for example, air containing oxygen) is supplied to the cathode electrode 12 through the oxidizing gas path 16. Then, hydrogen is ionized by the catalyst layer (not shown) of the anode electrode 11, and it moves to the cathode electrode 12 side through the solid polymer electrolyte membrane 13. The electrons generated at this time are taken out to the external circuit, and used as electrical energy in a direct current. At this time, hydrogen ions, electrons, and oxygen react to produce water.

At this time, the electrodes which oppose to each other of the cells 2a and 2b which adjoin each other in the stacking direction have the same electrical potential. For example, as shown in FIG. 1, the electrical potential Vk (1) of the cathode electrode 12 of the first cell 2a located at the first row of the end of the [−] pole side is equivalent to the electrical potential Va (2) of the anode electrode 11 of the second cell 2b in the second row, which adjoins thereto.

In this way, the anode electrode 11 or the cathode electrode 12 of the second cell 2b in the fuel cell 1 has an electrical potential equivalent to that of the cathode electrode 12 or the anode electrode 11 of the first cell 2a which adjoins the second cell 2b in the stacking direction.

For example, the voltage V(n−1) of the second cell 2b located in the (n−1)st row on the H [+] pole side can be obtained as the difference between the electrical potential Va (n−1) of the anode electrode 11 of the second cell 2b and the electrical potential Vk(n−1) of the cathode electrode 12. And the electrical potential of the anode electrode 11 of the second cell 2b is equivalent to that of the cathode electrode 12 of the first cell 2a located at the (n−2)th row, and the electrical potential of the cathode electrode 12 of the second cell 2b is equivalent to that of the anode electrode 11 of the first cell 2a located at the nth row. In other words, the electrical potential Va (n−1) is equivalent to the electrical potential Vk (n−2), whereas the electrical potential Vk (n−1) is equivalent to the electrical potential Va (n). Therefore, the electrical potential V (n−1) of the second cell 2b can be obtained as the difference between the electrical potential Vk (n−2) and the electrical potential Va (n).

Therefore, the voltage of the second cell 2b with no terminals 6 and 7 can be obtained from the electrical potential of the anode electrode 11 or of the cathode electrode 12 of the first cell 2a which adjoins the second cell 2b in the stacking direction.

Moreover, in the fuel cell 1 of this embodiment, the first cells 2a are disposed at both ends of the [+] polar side and the [−] polar side, and the first cells 2a and the second cells 2b are stacked from the both ends alternately, and hence it is possible to know certainly the voltage of the first cells 2a which are disposed at both ends and the second cells 2b which adjoin the first cells 2a in the stacking direction. Accordingly, substantially all of the cell voltages can be detected, and as a result, it is possible to maintain high detecting accuracy equivalent to the case of disposing the terminals 6 and 7 to the anode electrodes 11 or the cathodes 12 of all of the cells 2. In particular, when the total number of the cells is an odd number, it becomes possible to detect all of the cell voltages by stacking the first cells and the second cells alternately.

When the total number of the cells is an even number, the first cells are stacked exclusively at the center position, and thereby all of the cell voltages can be detected.

And since the total number of terminals 6 and 7 can be lowered to be approximately half compared to the case of disposing terminals 6 and 7 to the anode electrodes 11 or the cathode electrodes 12 of all of the cells 2, the gaps between the terminals 6 and 7 can be sufficiently maintained, and it becomes possible to smoothly connect the connectors 8 and 9 to the terminals 6 and 7, respectively. Furthermore, cost can be lowered while preventing weight increase caused by the terminals 6 and 7.

It should be noted that it is needless to say that the scope of the present invention is not restricted only to the above embodiment. For example, although in this embodiment it is explained taking the case in which the first cells 2a which have terminals 6 and 7 are disposed at both ends in the stacking direction, it is also possible to dispose the second cells 2b at both ends.

In this case, it is necessary to insert a dummy separator into both ends to detect the cell voltage of the cells at both ends. Moreover, although the terminals 6 and 7 having a projected shape are formed outside the end surfaces of the separators 4 and 5, respectively, to be inserted into the connectors 8 and 9, respectively, it is also possible to form terminals having a groove shape inside the end surfaces of the separators 4 and 5 such that the connectors can be inserted thereto, and further, the terminals may be formed integrally without changing the outer shape of the separators 4 and 5.

Moreover, in this embodiment there is explained a case in which the first cells and the second cells, which constitute the fuel cell, are stacked alternately ranging over the entirety of the line, but what is necessary is that at least the first cells and the second cells are stacked alternately.

Hereinafter, the connecting structure to a cell of the voltage detecting connector and the fuel cell in another preferred embodiment of the present invention will be explained with reference to the drawings.

Figure 6:
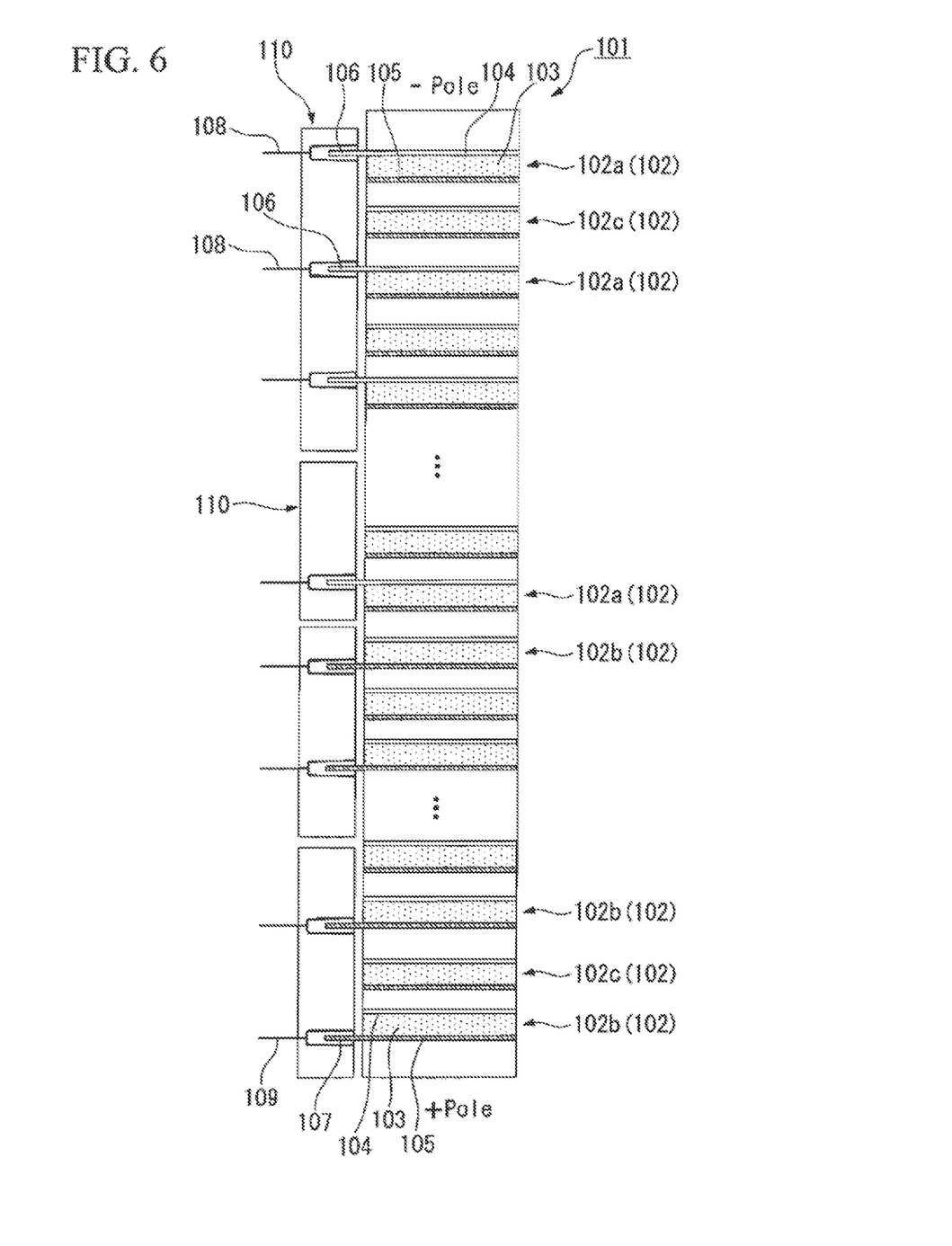
FIG. 6 is a sectional view of the principal part of a cell connecting apparatus equipped with a fuel cell and a voltage detecting connector connected to the fuel cell in another embodiment of the present invention.

FIG. 6 is a sectional view of the principal part of a cell connecting apparatus equipped with a fuel cell and a voltage detecting connector connected to the fuel cell in another preferred embodiment of the present invention. As shown in this figure, a fuel cell 101 is constituted from a plurality of cells 102 which are stacked in a predetermined number (in this case, n) of cells 102. Each cell 102 is constituted by sandwiching a membrane electrode structure 103 with separators 104 and 105.

The fuel cell 101 in this embodiment is equipped with first cells 102a (102) in which the terminal 106 for measuring voltage is disposed on a separator 104 on an anode electrode 111 side (refer to FIG. 7), second cells 102b (102) in which the terminal 107 for measuring voltage is disposed on a cathode electrode 112 side (refer to FIG. 7), and third cells 102c (102) which have terminals 106 and 107 in neither the separator 104 nor the separator 105.

A first cell 102a is disposed at the end of a [−] pole side, and a second cell 102b is disposed at the end of a [+] pole side, and the first cells 102a and the third cells 102c are stacked alternately, the second cells 102b and the third cells 102c are stacked alternately, from each end.

A cell connecting apparatus 110 is connected to the thus constituted fuel cell 101. The cell connecting apparatus 110 is equipped with a predetermined number of connectors 108 and 109, and can detect the voltages of the anode electrodes 111 of the first cells 102a and the voltages of the cathode electrodes 112 of the second cells 102b, by contacting the connectors 108 with the terminals 106 disposed on the first cells 102a, and by contacting the connectors 109 with the terminals 107 provided on the second cells 102b, respectively.

Figure 7:
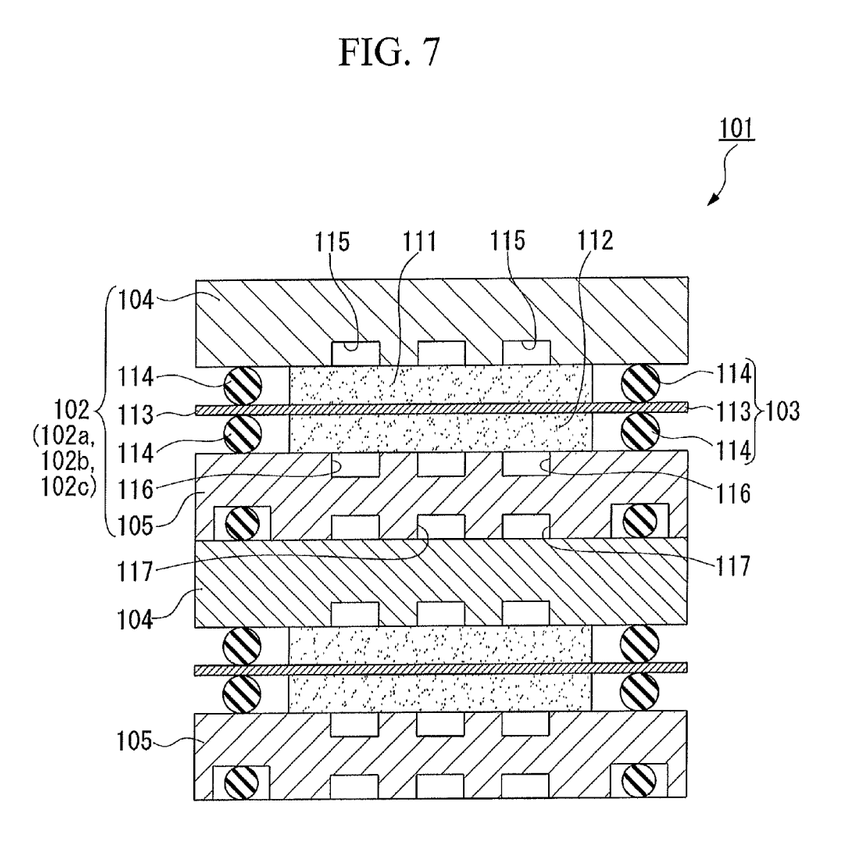
FIG. 7 is a schematic sectional view of a cell which constitutes a fuel cell shown in FIG. 6.

FIG. 7 is a schematic sectional view of a cell which constitutes the fuel cell shown in FIG. 6. As shown in this figure, the membrane electrode structure 103 is equipped with a solid polymer electrolyte membrane 113, and an anode electrode 111 and a cathode electrode 112 disposed on either side thereof.

A ring-like sealing member 114 is set on the periphery of the surface where a pair of the separators 104 and 105, which are disposed on both surfaces of the membrane electrode structure 103, oppose each other, and the solid polymer electrolyte membrane 113 is sandwiched by the sealing members 114. A fuel gas path 115, an oxidizing gas path 116, and a cooling medium path 117 for supplying fuel gas, oxidizing gas, and a cooling medium, respectively, are formed in both the separators 104 and 105.

Figure 8:
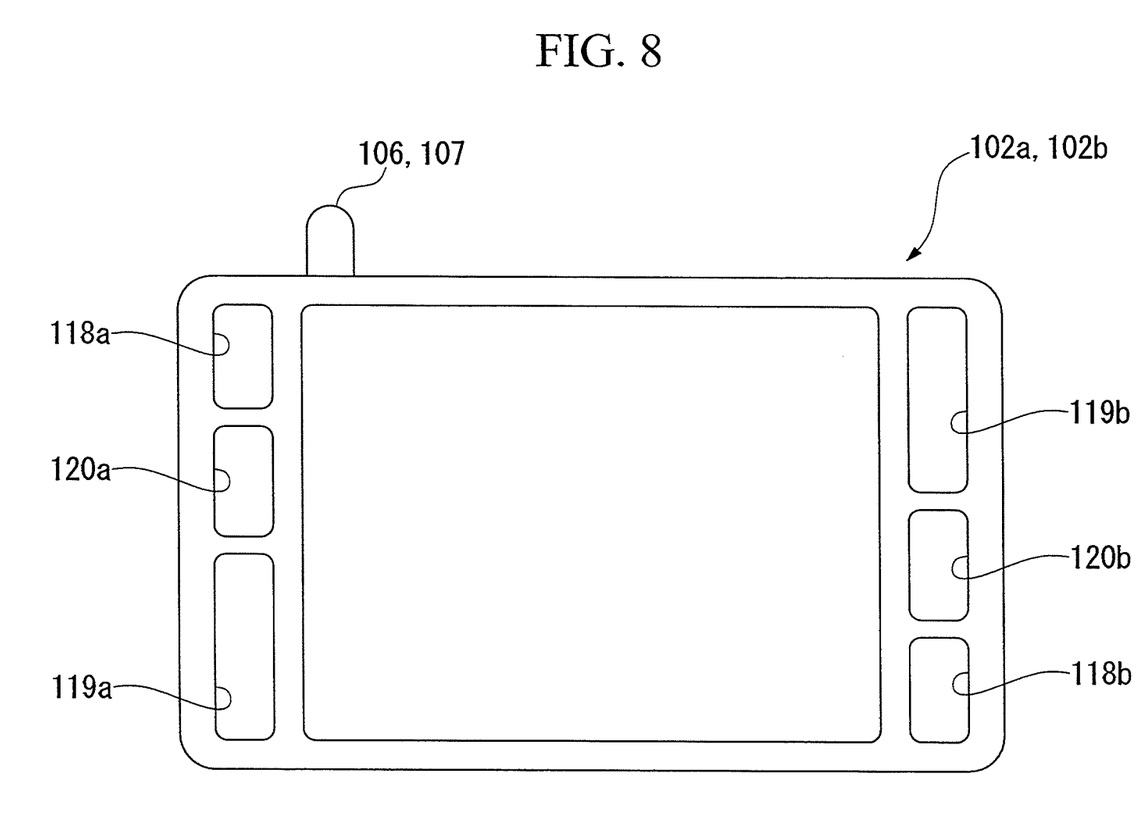
FIG. 8 is a plan view of a first cell and of a second cell shown in FIG. 6.

FIG. 8 is a plan view of one of the first cells in this embodiment. As shown in this figure, fuel gas penetrating holes 118a and 118b, oxidizing gas penetrating holes 119a and 119b, and cooling medium penetrating holes 120a and 120b are formed in both sides. In these penetrating holes, those on one side (left side in the drawing) serve as supplying ports 118a, 119a and 120a, whereas those on the other side (right side in the drawing) serve as discharging ports 118b, 119b, and 120b. It should be noted that the separator may be formed by cutting carbon etc., and may be formed by press molding a metal etc.

Figure 9:
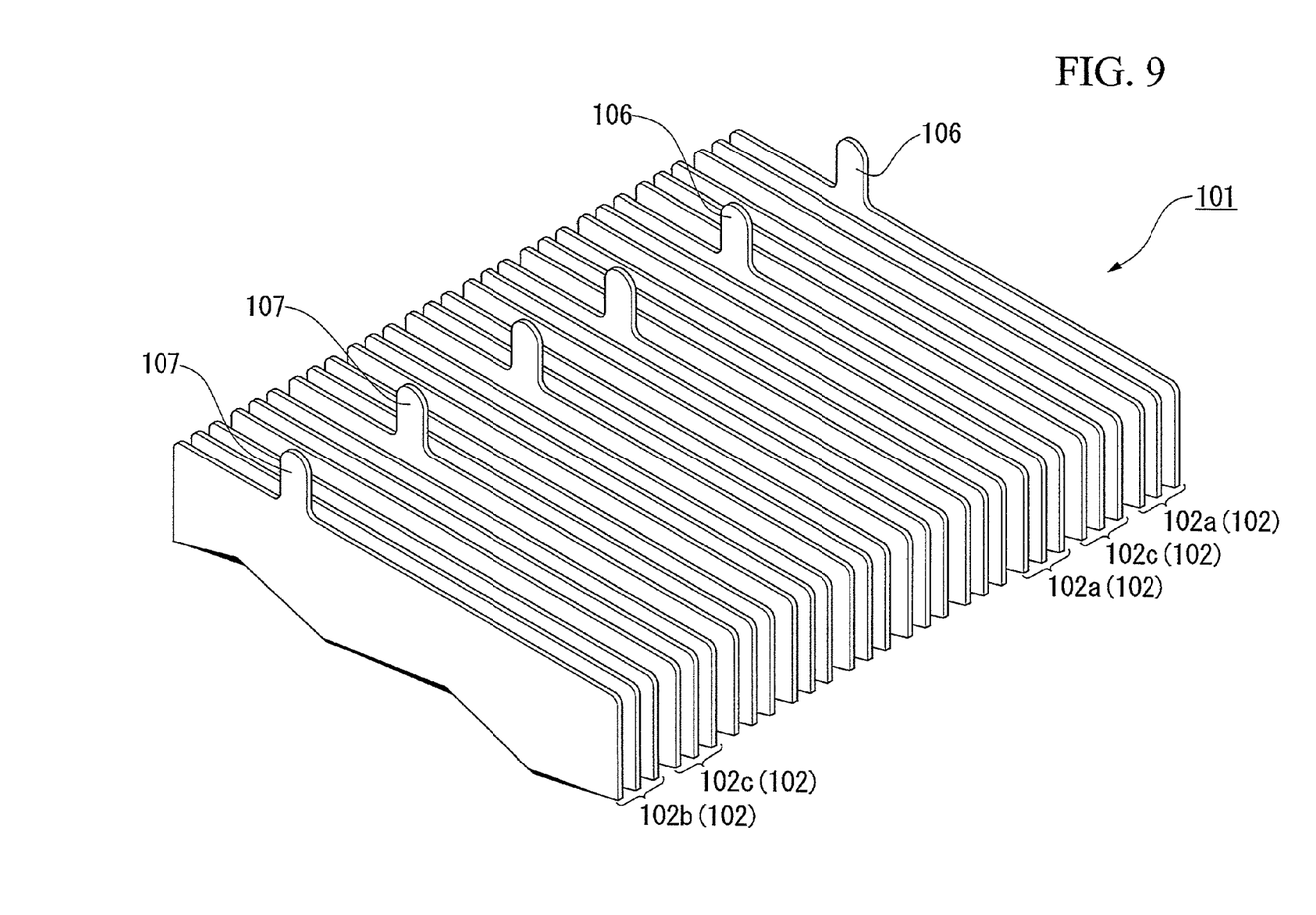
FIG. 9 is a perspective view of the principal part the fuel cell shown in FIG. 6.

Moreover, the terminals 106 and 107 disposed on the separators 104 and 105 of the first cell 102a are, as shown in FIG. 9, formed at approximately the same position, respectively, when they are looked at in the stacking direction.

In the fuel cell 101 thus constituted, fuel gas (for example, hydrogen gas) is supplied to the anode electrode 111 through the fuel gas path 115, and oxidizing gas (for example, air containing oxygen) is supplied to the cathode electrode 112 through the oxidizing gas path 116. Then, hydrogen is ionized by the catalyst layer (not shown) of the anode electrode 111, and it moves to the cathode electrode 112 side through the solid polymer electrolyte membrane 113. The electrons generated at this time are taken out to the external circuit, and used as electrical energy in a direct current. At this time, hydrogen ions, electrons, and oxygen react to produce water.

At this time, the electrodes which oppose each other of the cells 102a and 102b or of the cells 102b and 102c which adjoin each other in the stacking direction have the same electrical potential. For example, the electrical potential of the cathode electrode 112 of the first cell 102a located at the first row of the end of the [−] pole side is equivalent to the electrical potential V of the anode electrode 111 of the third cell 102c in the second row, which adjoins thereto. Moreover, the electrical potential of the anode electrode 111 of the second cell 102b located at the nth row at the [+] pole side is equivalent to the electrical potential of the anode electrode 112 of the third cell 102c located in the (n−1)th row, which adjoins thereto.

In this embodiment, since the third cells 102c are stacked with the first cells 102a or the second cells 102b alternately, it is possible to obtain the electric potential difference between two cells which adjoin each other (for example, the first cell 102a and the third cell 102c, or the second cell 102b and the third cell 102c). Therefore, it becomes unnecessary to dispose a dummy separator, a terminal, or a connector especially, which is not related to power generation, and the cell voltage of both ends can be detected, while lowering the number of parts, cost, stacking width, and increase in weight.

Since the total number of terminals 106 and 107 can be lowered to be approximately ¼ compared with the case of disposing terminals 106 and 107 on the anode electrodes 111 or the cathode electrodes 112 of all the cells 102, the gaps between the terminals 106 and 107 can be sufficiently maintained, and it becomes possible to connect smoothly connectors 108 and 109 to the terminals 106 and 107, respectively. Furthermore, cost can be lowered while preventing the weight increase caused by the terminals 106 and 107.

It should be noted that, needless to say, the scope of the present invention is not restricted only to this embodiment. In this embodiment, although there is explained a case in which the third cells are stacked with the first cells or the second cells alternately, the number of the third cells can be increased or decreased, corresponding to the required detecting accuracy. For example, it is possible to constitute the fuel cell from the first cells and the second cells, without using the third cells. In this case, when the first cells are stacked from one end of the fuel cell, whereas only the second cells are stacked from the other end of the fuel cell, it is possible to detect all of the cells by disposing cells which are equipped with terminals at both the anode and the cathode thereof at the center portion. Moreover, although the terminals 106 and 107 having a projected shape are formed outside the end surfaces of the separators 104 and 105, respectively, to be inserted into the connectors 108 and 109, respectively, it is also possible to form terminals having a groove shape inside the end surfaces of the separators 104 and 105 such that the connectors can be inserted thereto, and further, the terminals may be formed integrally without changing the outer shape of the separators 104 and 105.

According to the first aspect or the third aspect of the present invention, while detecting substantially all of the cell voltages, the gap between terminals is maintained, thereby preventing weight increase caused by the terminals, and increase in cost.

According to the second aspect or the fourth aspect of the present invention, the detecting accuracy of the cell voltage can be maintained at a level equivalent to the case of disposing terminals to the anodes and the cathodes of all cells. Moreover, it becomes unnecessary to dispose things like a special dummy cell by disposing the cell which has terminals at both ends thereof.

According to the fifth aspect or the eighth aspect of the present invention, the cell voltages of both ends can be detected, while lowering the number of parts, cost, stacking width and increase in weight.

According to the sixth aspect or the seventh aspect of the present invention, while maintaining the detection accuracy required, the number of terminals which are disposed on a fuel cell can be reduced further, thereby lowering the increase in weight and cost further.

What is claimed is:

1. A fuel cell system, comprising:
a fuel cell; and
a voltage detecting connecting apparatus for detecting voltage of the fuel cell,
the fuel cell having first cells having terminals provided to each of cathodes and anodes thereof, and second cells having terminals provided to neither cathodes nor anodes thereof, the first cells and the second cells are stacked in alternation, wherein the first cells are disposed on at least both ends of the fuel cell, and the fuel cell consists of the first cells and the second cells which are stacked alternately from both ends of the fuel cell, the voltage detecting connecting apparatus and the fuel cell are electrically connected by contacting the terminals with voltage detecting connectors in the voltage detecting connecting apparatus, each of the voltage detecting connectors being disposed at positions corresponding to each of the terminals.

2. A fuel cell comprising:
first cells provided with terminals to each of anodes and cathodes thereof, and second cells provided with no terminals to neither anodes nor cathodes thereof, wherein the first cells and the second cells are stacked alternatingly next to each other.

3. The fuel cell as set forth in claim 2, wherein the first cells are disposed to at least both ends in the direction of stacking, and the first cells and the second cells are stacked alternately from both ends.

4. A fuel cell comprising:
first cells provided with terminals to each of anodes and cathodes thereof, and
second cells provided with no terminals to neither anodes nor cathodes thereof, wherein the first cells are stacked from an end of an anode side in a stacking direction and the second cells are stacked from an end of a cathode side in a stacking direction, alternately, wherein the first cells and the second cells are stacked alternatingly next to each other.

* * * * *